(No Model.)
E. F. KEYES.
SKATE ROLLER.
No. 349,163. Patented Sept. 14, 1886.
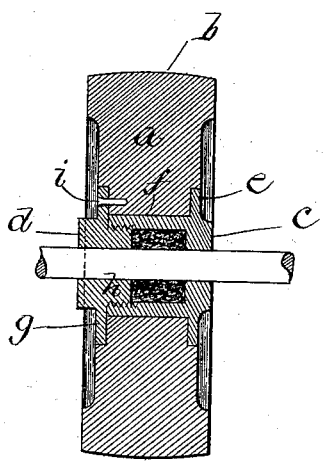
WITNESSES:
H. Brown.
A. D. Harrison
INVENTOR:
Edward F. Keyes
by Wright, Brown & Crossley,
att'ys

UNITED STATES PATENT OFFICE.

EDWARD F. KEYES, OF BOSTON, MASSACHUSETTS.

SKATE-ROLLER.

SPECIFICATION forming part of Letters Patent No. 349,163, dated September 14, 1886.

Application filed January 9, 1886. Serial No. 188,063. (No model.)

*To all whom it may concern:*

Be it known that I, EDWARD F. KEYES, of Boston, in the county of Suffolk and State of Massachusetts, have invented certain new and useful Improvements in Rollers or Wheels, of which the following is a specification.

My invention relates to rollers for roller-skates, wheels, and analogous contrivances, and has for its object to provide means whereby such devices may be rendered in a sense self-lubricating.

My invention consists in forming the bearing for the axle or shaft of the roller or wheel of two plates, the first provided with a cylindrical offset adapted to fit in the bore of the roller or wheel, said cylindrical offset being internally screw-threaded at its end, the other plate being provided with a short offset formed as a plug, screw-threaded on its exterior and adapted to be screwed into the end of the cylindrical offset, thus forming a chamber in the interior of the roller or wheel, which chamber is filled with lubricating material, whereby the axle or shaft is thoroughly lubricated and the lubricating material prevented from running down upon the tread or face of the roller or wheel.

My invention will first be described in connection with the drawing, and subsequently pointed out in the claims.

The figure in the drawing represents a vertical section of a roller or wheel embodying my invention.

$a$ represents the body of the roller, and $b$ the tread or face thereof. The body is provided with a bore considerably larger than is required for the axle or shaft upon which it is to turn, and as a bearing for the axle or shaft I provide two plates, $c$ and $d$, the former provided with a flange, $e$, and a cylindrical offset, $f$, bored out so as to form a chamber of considerable size therein. Said cylindrical offset is screw-threaded on its interior, at its end, as shown, and is of such size as to fit the bore of the body quite closely. Plate $d$ is provided with a flange, $g$, similar to flange $e$ of plate $c$, and an offset, $h$, formed as a short plug, screw-threaded on its exterior and adapted to be screwed into the screw-threaded end of cylindrical offset $f$, closing that end of the chamber formed therein, excepting the bore formed for the axle or shaft. The flanges $e$ and $g$ of of the plates are countersunk into the sides of the body $a$, so that their outer surfaces are even with the side faces of said body. The chamber, formed in the interior of the plates, is filled with lubricating material of any suitable character—such as a compound of oil, paraffine, asbestus, and plumbago, or the like—by which the axle or shaft passing through the plates and having its bearings therein will be kept thoroughly and evenly lubricated for a very long while after a single application of the lubricating material, and liability of the lubricant running out and down upon the sides or face or tread of the roller or wheel is avoided. Plate $d$ is provided with a square or polygonal head by which means it may be readily turned or screwed out of the end of cylindrical chamber or offset $f$, and the lubricant therein renewed.

To prevent plate $d$ from turning when once screwed into place, a hole is formed in the flange and a pin or screw, $i$, is inserted therein and driven or screwed into the body of the roller or wheel, as shown in the drawing.

While I have thus given a minute description of the manner in which I prefer to construct my invention, it is obvious that the construction may be varied without departing from the spirit of the invention.

What I claim is—

1. A roller or wheel consisting of a body chambered in its interior and two separate and independent plates secured one to each side of the roller or wheel to form bearings for the shaft or axle, one of said plates being provided with a cylindrical offset to receive a lubricant, and the other plate being provided with an offset formed as a plug to close the open end of said cylindrical offset, as set forth.

2. The combination, with the chambered body $a$, of the plate $c$, having the chambered offset $f$, screw-threaded on the interior of its inner end, and the plate $d$, provided with the offset $h$, formed as a plug and screw-threaded on its exterior to be screwed into the inner end of the offset $f$, as set forth.

3. The combination, with the body $a$, of the plate c, provided with the flange e and the cylindrical chambered offset f, screw-threaded on the interior of its inner end, and the plate d, provided with the flange g and the offset h, formed as a plug and screw-threaded on its exterior, to be screwed into the inner end of the offset f, said flanges g and e being countersunk in the sides of the body, as set forth.

In testimony whereof I have signed my name to this specification, in the presence of two subscribing witnesses, this 6th day of January, 1886.

EDWARD F. KEYES.

Witnesses:
ARTHUR W. CROSSLEY,
A. D. HARRISON.